United States Patent [19]

De Angelis

[11] Patent Number: 5,526,552
[45] Date of Patent: Jun. 18, 1996

[54] CABLE END CONNECTION FOR A SYNTHETIC FIBER CABLE

[75] Inventor: Claudio De Angelis, Root, Switzerland

[73] Assignee: Inventio AG, Hergiswil, Switzerland

[21] Appl. No.: 307,798

[22] PCT Filed: Mar. 2, 1994

[86] PCT No.: PCT/CH94/00044

§ 371 Date: Sep. 30, 1994

§ 102(e) Date: Sep. 30, 1994

[87] PCT Pub. No.: WO94/20770

PCT Pub. Date: Sep. 15, 1994

[30] Foreign Application Priority Data

Mar. 5, 1993 [DE] Germany ............... 43 08 827.9

[51] Int. Cl.⁶ .................................................. F16G 11/00
[52] U.S. Cl. ................... 24/136 L; 24/115 N; 24/129 R
[58] Field of Search ................. 24/136 L, 136 R, 24/115 N, 115 L, 129 R, 136 K, 908; 403/215

[56] References Cited

U.S. PATENT DOCUMENTS

| | | | |
|---|---|---|---|
| 644,404 | 2/1900 | Christ et al. | 24/129 R |
| 703,236 | 6/1902 | Christ et al. | 24/129 R |
| 2,269,615 | 1/1942 | Walker | 24/129 R |
| 2,547,469 | 4/1951 | Husson | 24/129 R |

FOREIGN PATENT DOCUMENTS 0024986  9/1903  United Kingdom ............... 24/129 R Primary Examiner—Victor N. Sakran
Attorney, Agent, or Firm—Greenblum & Bernstein

[57] ABSTRACT

Cable end connection for a synthetic fiber cable. The cable end connection is suitable for highly loaded synthetic fiber cables wherein a spiral-shaped groove is cut into the generated surface of a truncated cone-shaped retaining body, with the depth of the groove corresponding, in a first section, to the diameter of the synthetic fiber cable, and thereafter reducing as the cable extends downwardly, so that the synthetic fiber cable, when viewed from top to bottom, increasingly emerges from the groove and, as the inclination of the groove decreases, when viewed from top to bottom, the cable, at an inlet, enters in a straight line, in a vertical direction, into the groove and ends at the lower body end in about the horizontal direction, with the truncated cone-shaped retaining body being surrounded by a coaxial cone-shaped bell which includes an opening at an upper end for the inlet of the cable and changes at a lower end into a cylindrical casing portion having a load bore so that when loaded, the bell abuts the retaining body and presses the cable, depending upon the depth of the groove, more or less strongly into the groove.

18 Claims, 2 Drawing Sheets

5,526,552

CABLE END CONNECTION FOR A SYNTHETIC FIBER CABLE

CROSS REFERENCE TO RELATED APPLICATIONS

This application claims the priority of PCT Application No. PCT/CH94/00044, filed Mar. 2, 1994, which in turn claims the priority of German Application No. DE P 43 08 827.9, filed Mar. 5, 1993, the disclosures of which are incorporated herein by reference in their entireties.

BACKGROUND OF THE INVENTION

1. Field of the Invention

This invention emanates from a cable end connection for a synthetic fiber cable comprised of an apparatus for securing a heavy load and an apparatus for restraining the synthetic fiber cable, the restraining apparatus having next to an inlet for the synthetic fiber cable, a first casing-shaped section with an inner cross section at least as wide as the cross section of the cable, that is not stressed via side loads, and the inlet being aligned in the direction of the tensioned cable and the restraining apparatus having a subsequent second section in which the cable is preferably held via side pressure which increases with the increasing tensile forces of the cable.

2. Discussion of the Background of the Invention and Material Information

Such a mechanism, known from published patent document DE-1 292 457, is comprised of a rigid conical casing which surrounds a spliced cable end which is expanded via resin to a rope socket. The slope of the generated surface of the casing, with regard to the cable axis, is smaller than the slope of the generated surface of the rope socket with regard to the cable axis. This should achieve that the transverse stress of the fibers at the cable terminating end in the rope socket are minimal at the position at which the longitudinal stress of the fibers is maximal.

In the proposed solution, in the region ahead of the maximum transverse stress, only very minimal portions of the tensile force can be taken up by the casing and the mechanism therefore has scarcely any advantages vis-a-vis the current cable clamps. Cavitation during the casting of the rope socket can, under load, become a safety risk. An additional disadvantage of this known mechanism lies in the fact that with strong cables with corresponding high tensile strength, voluminous anchorings are necessary since the diameters of the rope socket and the casing become very large.

From British patent GB 106 207 a cable clamp, for steel cables used in the elevator field, has become known, in which the cable is clamped between two wedge-shaped clamping plates. These are pressed against each other via a U-shaped part which narrows toward the leg portions, upon which the load acts.

Several rings surround the U-shaped part to avoid the widening thereof under load. The clamping plates each include, on their inner sides, a slightly subsiding wave-shaped semicircular groove. In order to obtain an adequate clamping force, the semicircular grooves are formed flatter than half of the cable size so that a continuous slot remains between the clamping plates. The cable end extending from the groove is fanned out and retained in a conical casing which is plugged with metal.

The known cable clamp is designed for steel cables and its action is based on a very high transverse pressing of the cable. For that reason it is not useable for synthetic fiber cables in which the tensile strength thereof is substantially reduced via transverse stress of the fibers. A reduction of the tensile strength via the cable end connection would mean thicker cables, greater technical expenditures and higher costs. A further disadvantage of the known cable clamp lies in the expensive production process for the snaking and variable depth semicircular grooves cut into the clamping plates.

SUMMARY OF THE INVENTION

The present inventin solves the problem by avoiding the disadvantages of the known devices and by producing a cable end connection for synthetic fiber cables for carrying high loads for which the high tensile strength of the high strength fiber cable can be utilized. The cable connection fulfills, in particular, the requirements in the elevator field, where high loads must be attached at small assembly areas.

The advantages achieved via the invention are mainly in the fact that the cable, in the entrance area, transverse to extent of the fibers is not stressed via clamps and that the tensile force in the cable is, to a large extent, taken up via friction of the end connection. It is particularly advantageous that the cable end connection, when viewed in the direction of the stressed cable is of slender form, which permits a close arrangement of the parallely extending cables. In addition, the large cable diameters do not act on the width but rather upon the length of the cable end connection. An additional advantage resides in the fact that the stretching of the cable caused by the tensile force, can with the cable end connection of this invention, readily be compensated for by regulating the tension. It is also advantageous that during the pulling stress no moments of torsion occurs at the cable end connections.

Specifically, the cable end connection for a synthetic fiber cable of this invention is comprised of an apparatus for securing a heavy load and an apparatus for restraining the synthetic fiber cable, the restraining apparatus having next to an inlet for the synthetic fiber cable, a first casing-shaped section with an inner cross section at least as wide as the cross section of the cable, that is not stressed via side loads, and the inlet being aligned in the direction of the tensioned cable and the restraining apparatus having a subsequent second section in which the cable is preferably held via side pressure which increases with the increasing tensile forces of the cable wherein the first casing-shaped section has a curvilinear groove extending around an axis lying in the direction of the tensioned cable, in which the incoming cable, upon the application of tension, is only in frictional contact with walls of the groove, so that the tensile force is successively taken up by the groove. Preferably, the curvature of the groove, starting at an initially straight-lined inlet, gradually becomes continuously greater and the radius of curvature, after the less curvelinear first section, equals about one to six times that of the diameter of the cable.

In another embodiment of the cable end connection of this invention, the apparatus for restraining the cable includes a retaining body, the retaining body having a truncated cone-shaped generated surface, with the groove being spirally cut into the cone-shaped generated surface.

In a further embodiment of the cable end connection of this invention, the groove depth in the first section corresponds with the cable diameter of the synthetic cable and thereafter decreases so that the cable, when viewed from the inlet, increasingly emerges from the groove and, wherein the second section includes a coaxial hollow cone-shaped bell, conforming to the outer contour of the truncated cone-shaped retaining body, with the bell surrounding the retaining body and including an opening at the upper end for the cable inlet and the apparatus for securing a load at the lower end. Preferably, the inclination of the spiral-shaped groove, when viewed from the inlet decreases and ends in a helix at the cable end terminating body end.

In a differing embodiment of the cable end connection of this invention, the retaining body includes a cylindrically-shaped body portion following subsequent to the body end, with the spirally cut groove in the retaining body continuing helically within cylindrically-shaped body portion and being enveloped by a cylindrically-shaped casing portion of the bell.

In a variation of the previous embodiments, the bell wall of the bell has a slight inclination compared with the generated surface of the truncated cone-shaped retaining body.

In yet another embodiment of the cable end connection of this invention, the apparatus for restraining the cable includes a first retaining plate with a first meandering semicircular groove and a second retaining plate with a corresponding second meandering semicircular groove, with the retaining plates, at a clearance-free adjacently abutting condition, having a groove formed of the two semicircular grooves, the latter fully receiving the synthetic fiber cable. Preferably, the groove is curved in one of a meandering and sinusoidal shape and curvatures of the groove lie in a junction plane of the retaining plates.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein there is shown in.

DETAILED DESCRIPTION OF THE PREFERRED EMBODIMENTS

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

Figure 1:
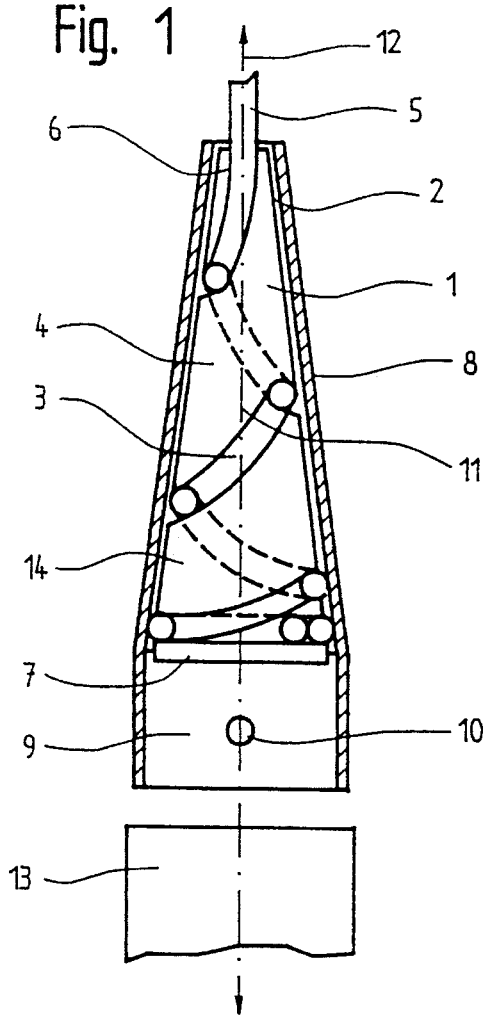
FIG. 1 is a partially sectioned side view of the cable end connection of this invention, having a cylindrical cone and a bell in accordance with a first embodiment.

In FIGS. 1–4 numeral 1 designates a retaining body 1 having a spiral-shaped groove 3 cut into its truncated cone-shaped generated surface 2. A synthetic fiber cable 5 is received within groove 3. The width of the groove corresponds to at least the diameter of the cable. Cable 5 initially enters, in a straight line, into the concentric inlet 6 at the upper end of retaining body 1. The depth of groove 3 corresponds, in a first casing-shaped section 4 near the inlet of cable 5, with the diameter of the cable, and decreases progressively in its further extent toward the bottom, so that the synthetic fiber cable 5, when viewed from top to bottom, increasingly emerges from groove 3. The inclination of groove 3, when viewed from inlet 6, decreases progressively. The curvature of the cable correspondingly increases more in degree, preferably until the maximum flexibility of the cable is reached. In a second section 14, the radius of curvature, depending upon the rigidity of synthetic fiber cable 5, equals one to six times that of the diameter of the cable. The entry of cable 5 into retaining body 1 occurs in the direction of the cable under load, that is, normally in a vertical direction, as is illustrated in FIG. 1. The end of the cable extends at lower body end 7, as a result of the decreasing inclination of groove 3, obliquely to the entrance direction, that is, in FIG. 1, horizontally.

The truncated cone-shaped retaining body 1 is enveloped by a coaxial cone-shaped bell 8, which includes, in the upper end, an opening for the cable inlet and, at the lower end, a cylindrically-shaped casing portion 9 having an apparatus, shaped as bores 10, for securing a load, indicated by numeral 13. The arrow, at load 13, indicates the direction of action. Bores 10 lie on axis 11 of a tensile force 12 acting on cable 5. For the attachment of load 13, a non-illustrated rod can, for example, be slid into bores 10. When loaded, bell 8 abuts retaining body 1 and presses cable 5, depending upon the depth of the groove, more or less strongly into groove 3. When the cable is unloaded, the bell prohibits the cable 5 from jumping out of groove 3.

The tensile force in cable 5, acting in the direction of axis 11, is gradually transferred to retaining body 1 via the friction in groove 3. In the second, subsequent section 14 of retaining body 1, synthetic fiber cable 5, when viewed from top to bottom, is progressively pressed into groove 3 by bell 8. The thereby slowly decreasing lateral forces which increase with the progressive establishment of the pull or tension 12 in retaining body 1, remain so locally slight, that the effective tensile strength of the cable is not diminished.

The stretching of cable 5, caused by the tensile load thereon can easily be regulated in that it is wound down from retaining body 1 and thereafter wound up again with a shortened cable length. Tools are not required for this procedure. Any leftover cable end is merely cut off.

Figure 2:
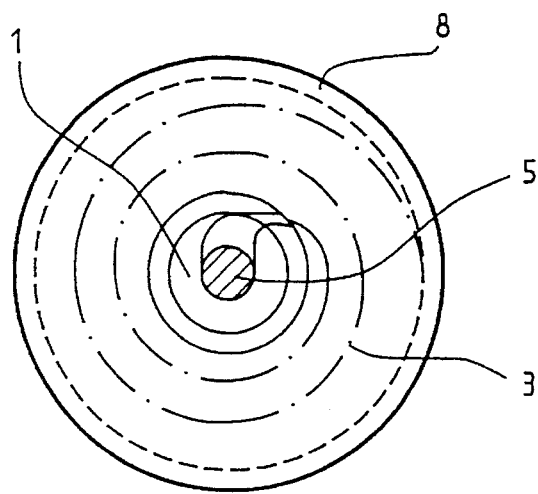
FIG. 2 is an enlarged top plan view of the cable end connection of this invention in accordance with FIG. 1.

The top plan view, in accordance with FIG. 2, shows the concentric inlet of cable 5 and the spiral extent of groove 3.

Figure 3:
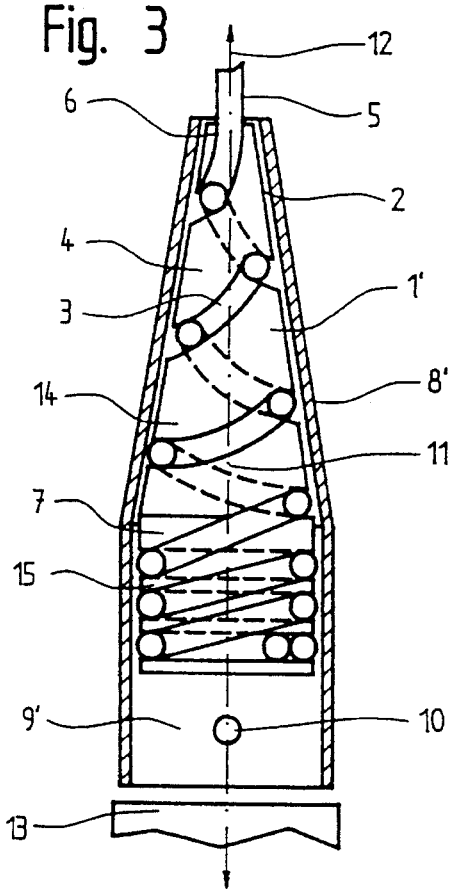
FIG. 3 is a second embodiment in longitudinal section, of a cable end connection.

In a second embodiment, in accordance with FIG. 3, the lower body end 7, of truncate cone-shaped retaining body 1', changes over into a cylindrical body portion 15. Correspondingly, the cylindrically-shaped casing portion 9' of bell 8' is increased in length. Spirally-shaped groove 3, cut into truncated cone-shaped retaining body 1', is continued in cylindrical body portion 15, with at least one loop. Thereby, the pressure of cable 5, in lower body portion 14, can be minimized or possibly even totally eliminated.

The variation or embodiment of FIG. 3 is especially suitable for high loads 13, for which a longer groove is necessary. High loads thus do not require undesired wide, but rather longer retaining apparatuses. By means of a close concentration of the looping in the lower section, the increase in length can be minimized. Even with large cable diameters, only the length of the cable end connection is increased, but the slenderness or narrowness thereof in maintained.

Retaining body 1 can also be cylindrically-shaped, whereby groove 3, in first section 4, must be cut very deep in order to produce an opening spiral-shaped extent.

Figure 4:
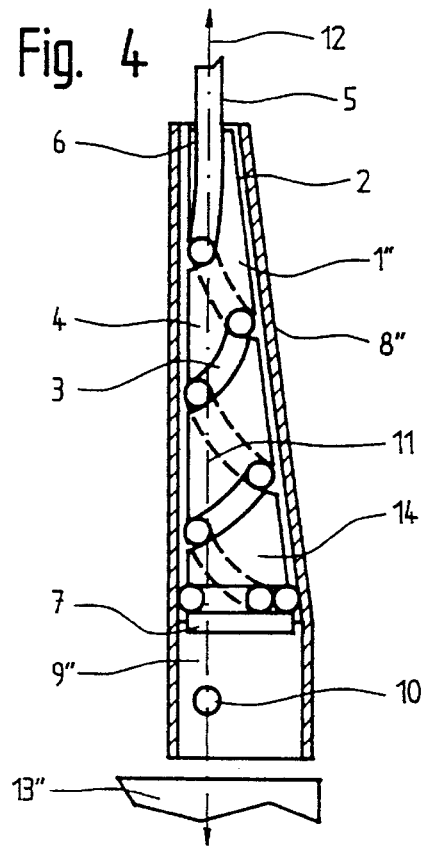
FIG. 4 is a partially sectioned side view of a third embodiment having an asymmetric cone and an asymmetric bell.

In the third embodiment, according to FIG. 4, retaining body 1" and bell 8" are shaped asymmetrically relative to the axis 11 of tensile force 12. Cylindrically-shaped casing 9" is arranged eccentrically relative to axis 11 with load 13" being attached on the extension thereof. The remaining structure and operation of this cable end connection are identical with that of the previously-described embodiments. The advantage of the asymmetrical shape is the reduced space requirement on the flattened side, so that two or four cable end connections can be arranged directly or radially adjacently abutting. This permits an extraordinarily minimal cable spacing.

The pressure of cable 5 in lower body portion 14 can, in addition to the groove depth, also be influenced via the slope or inclination of the bell wall with regard to generated surface 2. Then, the bell wall has a slight slope with regard to generated surface 2. Therewith, the pressure is eliminated in first portion 4 and increased in second, lower section 14.

Figure 5:
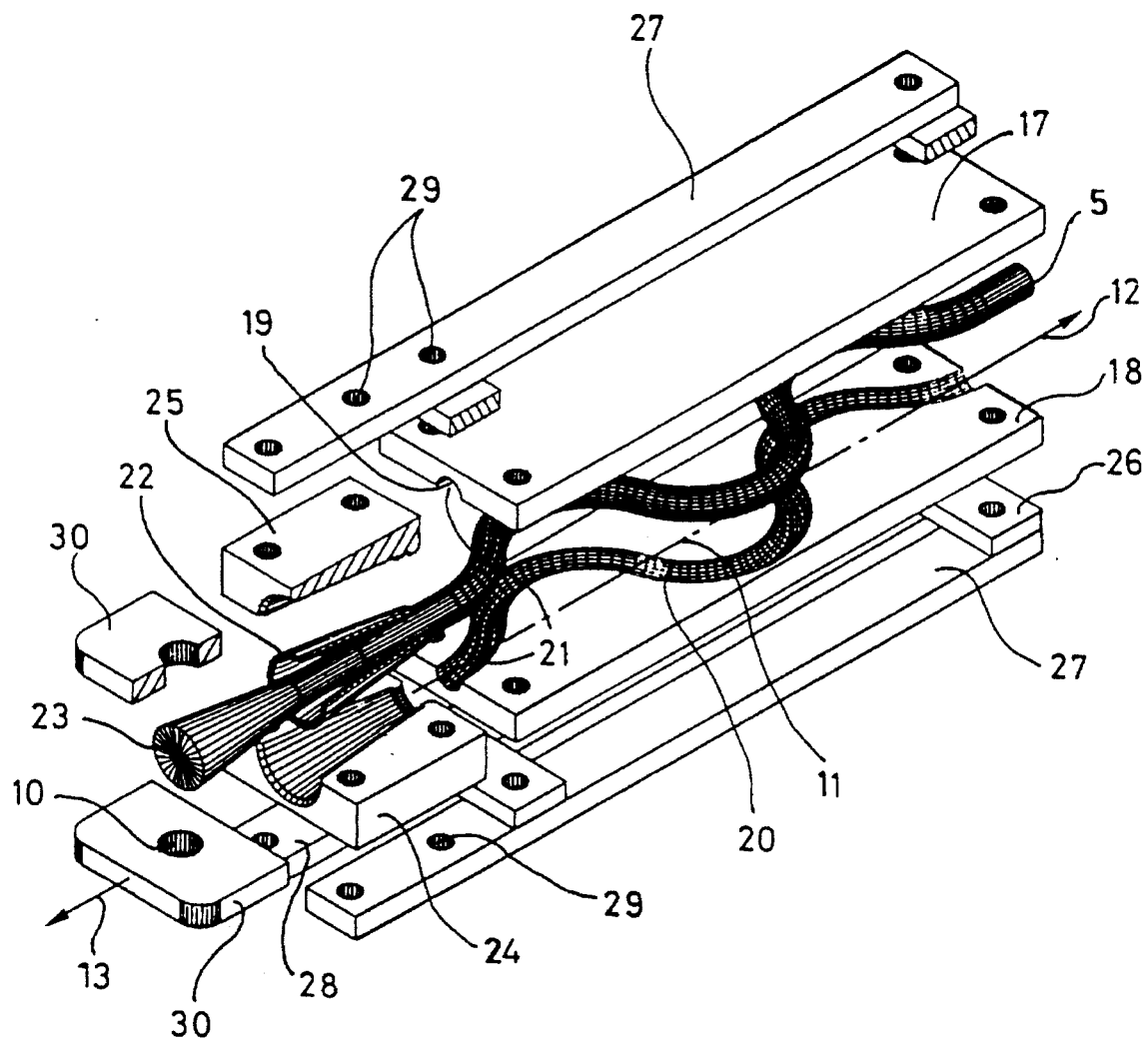
FIG. 5 is an exploded view of a fourth embodiment having retaining plates.

In the cable end connection, in accordance with FIG. 5, the cable is curved only in one plane. In a first retaining plate 17, a first semicircular groove 19 is arranged in a meandering manner in the plane of the retaining plate and around axis 11 in the direction of tensile force 12. A second retaining plate 18 contains a second corresponding semicircular groove 20. In clearance-free adjacently abutting retaining plates 17, 18, synthetic fiber cable 5 is fully received within a groove 21, formed of both semicircular grooves 19, 20, without any side pressure. Cable 5 extends, other than in inlet 6, greatly curved in loop fashion around axis 11 of tensile force 12 and is loosely surrounded by retaining plates 17, 18 that are bolted together. The cable end that extends from the groove is fanned out in a conical casing 22 which is filled with a sealing compound that is appropriate for the cable material, thus forming a sealing cone. Conical casing 22 is loosely enclosed by a first sealing plate 24 and a second sealing plate 25. Retaining plates 17, 18 are removably connected with distance or spacer plates 26, side bars 27 and a web plate 28, via bolts extending through bores 29. At web plate 28, at the cable terminating end, end plates 30 are arranged, on which the retaining load engages in the direction of arrow 13.

For example, groove 21 can be sinusoidally-shaped. It can advantageously also be meander-shaped. Amplitude and radius of curvature are adapted to the width of the available space and the diameter of the cable. The radius of curvature should, however, in the second section in dependence from the rigidity of the cable, be chosen as narrow as possible. Suitable are radii of about one to six times the diameter of the cable.

Retaining plates 17, 18 are of massive construction in the illustrated embodiment. However, at the outer radius of the groove loops they can be discontinuous, which, if applicable, permits a visual inspection of the cable. In the interest of a narrow or slim construction, retaining plates 17, 18 can be directly bolted together and with sealing plates 24, 25, without bars or plates 27, 28.

Tensile force 12 acting along axis 28 of cable 5, is largely reduced in cable 5 via friction in groove 21 and transferred to retaining plates 17, 18. The tensile force 12 not yet dissipated via friction in the groove at the end of the cable, is transferred via sealing cone 23 and casing 22 to sealing plates 24, 25, without cable 5 losing any of its tensile strength.

The cable end connection of this invention is mainly utilized in the elevator field. In elevator installations the elevator car and the counterweight are connected via multiple parallel-guided cables that are driven by a traction sheave and run over diverting pulleys. The lateral spacing of the cables is controlled by the grooves of the traction sheave and the diverting pulleys and is but a few centimeters. It is therefore important that the elevator car and the counterweight are connected, via the slimmest possible cable end connections, with the cables. Projecting cable end connections would disrupt the cable line which leads to excessive wear of the cables and the cable lines, especially when the elevator car or the counterweight come into the vicinity of the traction sheave and the diverting pulley.

Elevator installations, on the one hand, require long cable lengths while on the other hand due to energy reasons there is the requirement for the smallest possible movable masses. High strength fiber cable of one-dimensional, extended molecular chains and a surrounding protective polyurethane covering fulfill these requirements. They are light in weight, have a small diameter and a high tensile strength. Without impairing their tensile strength such cables can only absorb small lateral forces caused by clamping or pressing. The cable end connection of this invention compensates for this disadvantage in that the tension force in the cable is to a large extent reduced in the groove via the high coefficient of friction of the polyurethane covering. It is also an advantage that covered synthetic fiber cables can be attached without severing or damaging the protective covering. The use of this invention is however not restricted to covered synthetic fiber cables.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A cable end connection for a multi-strand synthetic fiber cable in elevator installations, comprised of an apparatus for securing an elevator and an apparatus for restraining the synthetic fiber cable, the restraining apparatus having next to an inlet for the synthetic fiber cable, a first casing-shaped section with an inner cross section at least as wide as the cross section of the cable, that is not stressed via side loads, the inlet being aligned in the direction of the tensioned cable and the restraining apparatus having a subsequent second section in which the cable is held via side pressure which increases with the increasing tensile forces of the cable, wherein the first casing-shaped section has a curvilinear groove extending around an axis lying in the direction of the tensioned cable, in which the incoming cable, upon the application of tension, is only in frictional contact with walls of the groove, so that the tensile force is successively taken up by the groove.

2. The cable end connection of claim 1, wherein the curvature of the groove, starting at an initially straight-lined inlet, gradually becomes continuously greater.

3. The cable end connection of claim 2, wherein the apparatus for restraining the cable includes a first retaining plate with a first meandering semicircular groove and a second retaining plate with a corresponding second meandering semicircular groove, with the retaining plates, at a clearance-free adjacently abutting condition, having a groove formed of the two semicircular grooves, the latter fully receiving the synthetic fiber cable.

4. The cable end connection of claim 2, wherein the radius of curvature, after the less curvelinear first section, equals approximately one to six times that of the diameter of the cable.

5. The cable end connection of claim 4, wherein the apparatus for restraining the cable includes a first retaining plate with a first meandering semicircular groove and a second retaining plate with a corresponding second meandering semicircular groove, with the retaining plates, at a clearance-free adjacently abutting condition, having a groove formed of the two semicircular grooves, the latter fully receiving the synthetic fiber cable.

6. The cable end connection of claim 1 wherein the apparatus for restraining the cable includes a retaining body, the retaining body having a truncated cone-shaped generated surface, with the groove being spirally cut into the cone-shaped generated surface.

7. The cable end connection of claim 6, wherein the groove depth in the first section corresponds with the cable diameter of the synthetic cable and thereafter decreases so that the cable, when viewed from the inlet, increasingly emerges from the groove and, wherein the second section includes a coaxial hollow cone-shaped bell, conforming to the outer contour of the truncated cone-shaped retaining body, with the bell surrounding the retaining body and including an opening at the upper end for the cable inlet and the apparatus for securing a load at the lower end.

8. The cable end connection of claim 6, wherein the inclination of the spiral-shaped groove, when viewed from the inlet decreases and ends in a helix at the cable end terminating body end.

9. The cable end connection of claim 8, wherein the retaining body includes a cylindrically-shaped body portion following subsequent to the body end, with the spirally cut groove in the retaining body continuing helically within cylindrically-shaped body portion and being enveloped by a cylindrically-shaped casing portion of the bell.

10. The cable end connection of claim 8, wherein the bell wall of the bell has a slight inclination compared with the generated surface of the truncated cone-shaped retaining body.

11. The cable end connection of claim 7, wherein the inclination of the spiral-shaped groove, when viewed from the inlet decreases and ends in a helix at the cable end terminating body end.

12. The cable end connection of claim 11, wherein the bell wall of the bell has a slight inclination compared with the generated surface of the truncated cone-shaped retaining body.

13. The cable end connection of claim 7, wherein the retaining body includes a cylindrically-shaped body portion following subsequent to the body end, with the spirally cut groove in the retaining body continuing helically within cylindrically-shaped body portion and being enveloped by a cylindrically-shaped casing portion of the bell.

14. The cable end connection of claim 7, wherein the bell wall of the bell has a slight inclination compared with the generated surface of the truncated cone-shaped retaining body.

15. The cable end connection of claim 1, wherein the apparatus for restraining the cable includes a first retaining plate with a first meandering semicircular groove and a second retaining plate with a corresponding second meandering semicircular groove, with the retaining plates, at a clearance-free adjacently abutting condition, having a groove formed of the two semicircular grooves, the latter fully receiving the synthetic fiber cable.

16. The cable end connection of claim 15, wherein the groove is curved in one of a meandering and sinusoidal shape and curvatures of the groove lie in a junction plane of the retaining plates.

17. The cable end connection of claim 16, further including a cable end terminating pressing mechanism, comprised of a conical casing, the casing containing the fanned out cable ends in a sealing cone.

18. The cable end connection of claim 15, further including a cable end terminating pressing mechanism, comprised of a conical casing, the casing containing fanned out cable ends in a sealing cone.

* * * * *